Dec. 20, 1955 T. L. FAWICK 2,727,369
FLEXIBLE SHAFT-COUPLING
Filed Dec. 27, 1951
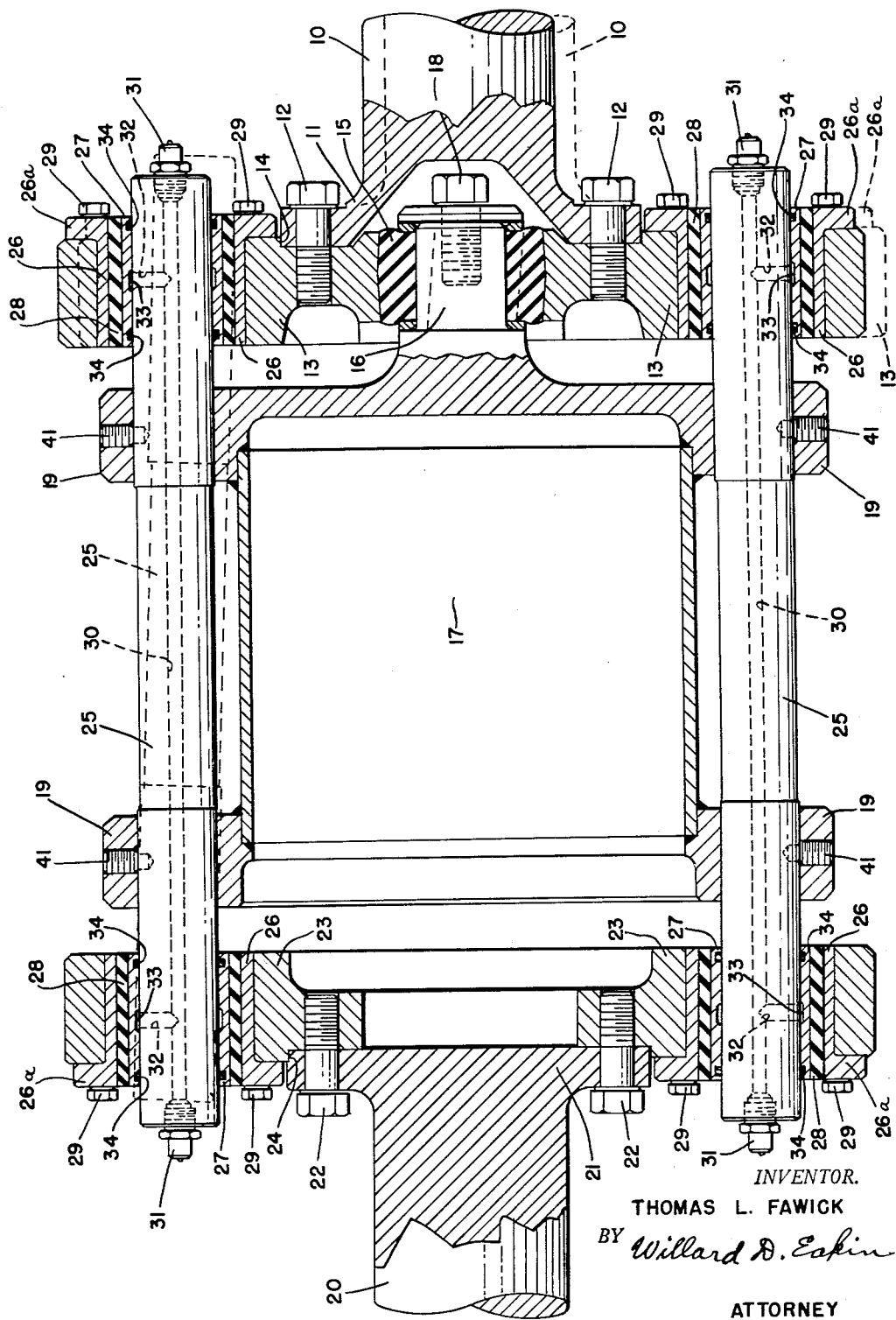
INVENTOR.
THOMAS L. FAWICK
BY Willard D. Eakin
ATTORNEY

[Patent No.] 2,727,369
Patented Dec. 20, 1955

2,727,369

FLEXIBLE SHAFT-COUPLING

Thomas L. Fawick, Cleveland, Ohio

Application December 27, 1951, Serial No. 263,646

6 Claims. (Cl. 64—11)

The invention relates to flexible couplings for shafts.

Its chief objects are to provide a coupling adapted to compensate for pronounced axial as well as angular misalignment of the driving and driven shafts; to provide that result without great loss of power and without heavy bearing load in the functioning of the coupling; to provide desirable cushioning of torque and of vibration; to provide simplicity and economy of construction, assembly and disassembly; and to provide facility and economy of repair by substitution of new parts.

The single figure of the accompanying drawing is an axial section of a coupling assembly embodying my invention in its preferred form.

A shaft 10, which preferably but not necessarily is the driving shaft, is formed with a hollow cone head 11 upon which is secured, by bolts 12, 12, a coupling member 13 formed with a shallow shoulder 14 for centering it upon the shaft-head 11.

The member 13 is formed with an axial hole in which is mounted a rubber bushing 15 surrounding an axial stem 16 formed on the closed end wall of a bell shaped coupling element 17. The rubber bushing 15 is maintained under radial compression, as by being clamped axially between a shoulder formed on the stem 16 and the head of a bolt 18 screwed into the end of the stem, with suitable clamping washers interposed. The hollow of the shaft-head 11 accommodates the bolt head and adjacent structure, for axial compactness of the assembly.

The bell-shaped structure 17 preferably, as shown, is made of a plurality of members welded together. It is formed with external, apertured flanges 19, 19, at its respective ends.

Beyond the open end of the bell-shaped structure 17 a shaft 20, which preferably but not necessarily is the driven shaft, is formed with a shaft-head 21 upon which is secured by bolts 22, 22 a ring-like coupling member 23, formed with a shallow shoulder 24 for centering it upon the shaft-head 21.

A circumferentially spaced set of axially disposed torque-transmitting bars such as the two shown at 25, 25 are mounted, and secured by set-screws 41, 41, in holes in the flanges 19, 19 of the bell-shaped structure 17 and the respective ends of these bars extend through larger socket holes through the coupling members 23 and 13 which are secured to the respective shaft heads.

In each of the said socket holes is mounted a rubber-bushing assembly comprising an outer metal sleeve 26 fitting in the socket and formed with an external stop-flange 26ᵃ at its outer end, an inner metal sleeve 27, and, held under compression in the annular space between the two sleeves, a rubber bushing 28, preferably of the type in which the rubber is held under radial compression by its own axial recoil, as the result of being vulcanized to the inner metal member and then being axially elongated and put under radial compression by being forced into the outer metal member.

Each of the outer metal sleeves, 26, 26, is held in its socket by bolts 29, 29 extending through the stop-flange 26ᵃ. The end portions of the torque-transmitting bars 25 slidably fit in the inner metal sleeves 27.

Each of the bars 25 preferably is formed with an oil or grease hole 30 extending axially through it, provided at each end with a lubricant fitting 31, and having communication, through branch holes 32, 32, with annular grooves 33, 33 in the inner faces of the inner-metal sleeves of the bushing assemblies.

Dust-excluding and grease-retaining rings 34, 34, preferably of circular section and of oil-resistant synthetic rubber, are mounted in respective grooves formed in the inner faces of the metal sleeves 27, at opposite sides of the grease-distributing groove 33.

In the operation of the coupling, assuming downward simple offset of the axis of the drive shaft 10 to its dotted-line position, the connecting parts, as they pass the top and bottom parts of the orbit, pass through substantially the positions in which they are shown in dotted lines, those parts of the orbit representing the extremes of their departures from their positions of symmetry, in which they are shown in full lines.

Such departures are permitted, without excessive strains in the structure and without great bearing load, and, accordingly, without great loss of power, because of the deformability of the rubber bushings 28 (and the rubber bushing 15, when present); because of the easy slidability of the bars 25 in the sleeves 27, to permit weaving action of the spider structure; and because of the considerable axial length of the torque-transmitting spider structure 17—25, such length permitting a large offset of the shafts' axes with only moderate angularity of the spider structure as the result.

At the same time the spider structure is of such large diameter as to transmit heavy torque without excessive torque load upon the rubber bushings 28 and other parts.

The rubber bushing 15, keeping the stem 16 of the spider structure approximately centered with relation to the shaft 10, prevents excessive whipping of the spider structure and thus permits the latter to be of sturdy construction for transmitting a heavy load. Having axial interlock with the parts which engage it, the bushing 15 prevents axial displacement of the spider as a whole although the spider's bars 25 are slidable, in service, in relation to all of the cushioning elements 28, for permitting a high degree of shaft-misalignment.

Similar advantages manifestly are provided in the case of angular misalignment of the shafts and in the case of a combination of angular misalignment and off-set of the axes. In the case of all such misalignment, the action is somewhat like that of a screw-driver held at an angle to the screw while being rotated upon its own, unwavering, axis.

For disassembly, removal of the set screws 41 and the bolts 22 and 12 permits easy removal of the bars 25 and the coupling member 23, after which the rest of the coupling structure can be moved a little to the left and then lifted out from between the shaft heads. Assembling of the device, by the reverse of that procedure, is an easy and simple operation, and either operation can be performed with the shafts in place.

Also, the rubber-bushing assemblies 26—27—28 can be easily mounted or removed individually without disturbing any other part.

The hollow cylindrical body portion of the spider structure is geometrically well adapted for sustaining high torsional strains without being very heavy.

Modifications are possible without sacrifice of all of the advantages and without departure from the scope of the invention as defined in the appended claims.

I claim:

1. A flexible shaft-coupling comprising a pair of coupling members presented to each other in axially spaced apart relation, a torque-transmitting spider structure mounted between and wholly supported by the two, a cushioning body connecting said spider to and insulating it from one of said members at the axis of rotation, and, connecting said structure to each of said members, a set of circumferentially spaced connections of which each comprises a cushioning body having substantially the resilient deformability of vulcanized soft rubber, with the said bodies insulating the said structure from the said members.

2. A shaft-coupling as defined in claim 1 in which the recited spider is of an effective length approximating the effective diameters of the recited sets of connections and in which each of the recited connections comprises a torque-transmitting element having axial-sliding and circumferential-interlock relation to the respective cushioning body.

3. A flexible shaft-coupling comprising a pair of shaft heads presented to but axially spaced from each other, a pair of coupling elements, manually releasable means securing said elements respectively to axially inner faces of the said shaft-heads respectively, each of said elements being formed with a set of circumferentially spaced, axially disposed sockets, the sockets of at least one of the said sets being through apertures, and a torque-transmitting spider interposed between the said coupling elements, said spider comprising a body, a set of circumferentially spaced, axially disposed bars, and manually releasable means for securing said bars in fixed positions on and in fixed relation to said body, the opposite end portions of each of the said bars projecting axially from the opposite ends of the said body and being slidable in but having driving interlock with the walls of respective ones of the said sockets, the end portions of the bars that are in the through-aperture sockets being unobstructed for axially outward movement in the said through aperture sockets such as to cause the ends of said bars to project axially outward from their said through-aperture sockets and thus permit withdrawal of the opposite ends of said bars from their respective sockets of the other set and from the said body of the spider, through the said through aperture sockets, and the spacing apart of the said shaft-heads being greater than the axial length of the said body of the spider plus that of one of said coupling elements.

4. A flexible-shaft coupling comprising a pair of coupling elements presented to but axially spaced from each other, each of said elements being formed with a set of circumferentially spaced, axially-disposed sockets, a spider interposed between said coupling elements, said spider comprising a body and at each end of said body a set of circumferentially spaced elements projecting into respective ones of the said sockets and freely slidable therein in service but interlocked with the walls thereof for transmission of torque, with clearance between the said body and each of the said coupling elements, and, at the axis of one of the said coupling elements, positioning means for maintaining the axial position of said spider in relation to that one of the said elements.

5. A shaft-coupling as defined in claim 4 and including individual cushioning means interposed between the wall of each socket and the part of the spider that projects into it.

6. A shaft-coupling as defined in claim 4 and including individual cushioning means interposed between the wall of each socket and the part of the spider that projects into it, and cushioning means constituting a part of the recited positioning means and individual thereto.

References Cited in the file of this patent

UNITED STATES PATENTS

| 1,323,850 | Fisher | Dec. 2, 1919 |
| 1,396,979 | Thomas | Nov. 15, 1921 |
| 1,482,097 | Smith | Jan. 29, 1924 |
| 2,145,532 | Standage | Jan. 31, 1939 |
| 2,477,447 | Fawick | July 26, 1949 |
| 2,595,393 | Langdon | May 6, 1952 |